US009874582B2

(12) United States Patent
Humphris

(10) Patent No.: US 9,874,582 B2
(45) Date of Patent: Jan. 23, 2018

(54) PROBE SYSTEM WITH MULTIPLE ACTUATION LOCATIONS

(71) Applicant: INFINITESIMA LIMITED, Abingdon (GB)

(72) Inventor: Andrew Humphris, Abingdon (GB)

(73) Assignee: INFINITESIMA LIMITED, Abingdon (GB)

(*) Notice: Subject to any disclaimer, the term of this patent is extended or adjusted under 35 U.S.C. 154(b) by 0 days.

(21) Appl. No.: 15/122,047

(22) PCT Filed: Feb. 27, 2015

(86) PCT No.: PCT/EP2015/054128
§ 371 (c)(1),
(2) Date: Aug. 26, 2016

(87) PCT Pub. No.: WO2015/128459
PCT Pub. Date: Sep. 3, 2015

(65) Prior Publication Data
US 2017/0016932 A1 Jan. 19, 2017

(30) Foreign Application Priority Data
Feb. 28, 2014 (EP) .................................. 14157211

(51) Int. Cl.
G01Q 10/04 (2010.01)
G01Q 70/08 (2010.01)
(Continued)

(52) U.S. Cl.
CPC .......... *G01Q 10/045* (2013.01); *G01Q 10/065* (2013.01); *G01Q 70/10* (2013.01)

(58) Field of Classification Search
CPC .... G01Q 20/02; G01Q 10/065; G01Q 10/045; G01Q 10/00; G01Q 10/04; G01Q 10/06;
(Continued)

(56) References Cited

U.S. PATENT DOCUMENTS 5,116,462 A    5/1992 Bartha et al.
5,196,701 A *  3/1993 Foster .................... B82Y 10/00
                                                  250/307
(Continued)

FOREIGN PATENT DOCUMENTS

WO    2009019513 A1    2/2009
WO    2009147450 A1    12/2009
(Continued)

OTHER PUBLICATIONS

Dongxiam Zhang et al.: "Theoretical and experimental study of optothermal expansion and optothermal microactuator," Aug. 18, 2008/vol. 16, No. 17, Optics Express, pp. 13476-13485.
(Continued)

Primary Examiner — David A Vanore
(74) Attorney, Agent, or Firm — Hauptman Ham, LLP

(57) ABSTRACT

A probe system including a probe with first and second arms and a probe tip carried by the first and second arms, the probe tip having a height and a tilt angle; an illumination system arranged to deform the probe by illuminating the first arm at a first actuation location and the second arm at a second actuation location each with a respective illumination power; and an actuation controller arranged to independently control the illumination power at each actuation location in order to control the height and tilt angle of the probe tip.

24 Claims, 12 Drawing Sheets

(51) Int. Cl.
*G01Q 10/06* (2010.01)
*G01Q 70/10* (2010.01)

(58) Field of Classification Search
CPC ........ G01Q 60/32; G01Q 60/38; G01Q 60/34;
G01Q 60/363; G01Q 60/40; G01Q 70/06;
G01Q 70/10; G01Q 70/14; B82Y 35/00;
B82Y 10/00; Y10S 977/863; Y10S
977/881; Y10S 977/849; Y10S 977/85;
Y10S 977/851; Y10S 977/86; Y10S
977/861; Y10S 977/869; Y10S 977/87;
Y10S 977/871; Y10S 977/873; Y10S
977/875; Y10S 977/947; G01N 21/335;
G01N 21/171; G01N 21/1717; G01N
21/3563; G01N 21/3581; G01N 21/552;
G01N 29/0663; G01N 29/0681; G01N
29/2418; G01N 29/265
USPC ....... 73/105, 603; 850/1, 3, 6, 33, 15, 2, 26,
850/36, 37, 38, 4, 5, 50, 55, 56, 61, 7;
977/863, 851, 870; 250/307, 339.07
See application file for complete search history.

(56) References Cited

U.S. PATENT DOCUMENTS

| | | | | |
|---|---|---|---|---|
| 6,330,824 B1* | 12/2001 | Erie | ............... | G01B 5/28 73/105 |
| 6,530,266 B1* | 3/2003 | Adderton | ............. | G01Q 10/045 73/105 |
| 7,036,357 B2* | 5/2006 | Adderton | ............... | B82Y 35/00 73/105 |
| 7,596,989 B2* | 10/2009 | Humphris | ............. | G01Q 60/38 73/105 |
| 7,958,565 B2* | 6/2011 | Ando | ............... | G01Q 10/065 850/33 |
| 8,387,443 B2* | 3/2013 | King | ............... | G01Q 60/38 73/105 |
| 8,438,927 B2* | 5/2013 | Shekhawat | ........ | G01N 29/0663 73/105 |
| 8,528,110 B2* | 9/2013 | Humphris | .......... | G01B 11/0608 356/28.5 |
| 8,869,602 B2* | 10/2014 | Belkin | ................ | B82Y 35/00 73/105 |
| 9,134,341 B2* | 9/2015 | Prater | ................ | B82Y 35/00 |
| 9,383,386 B2* | 7/2016 | Labuda | ................ | G01Q 60/38 |
| 9,410,982 B2* | 8/2016 | Humphris | ............ | G01Q 10/045 |
| 2007/0195333 A1* | 8/2007 | Negishi | ............... | B82Y 35/00 356/601 |
| 2010/0180354 A1 | 7/2010 | Degertekin | | |
| 2010/0186132 A1* | 7/2010 | Humphris | .............. | G01Q 70/06 850/1 |
| 2010/0235955 A1 | 9/2010 | Humphris | | |
| 2011/0138506 A1 | 6/2011 | Humphris | | |
| 2011/0247106 A1* | 10/2011 | Humphris | ............ | G01Q 10/065 850/6 |
| 2014/0026263 A1* | 1/2014 | Humphris | .............. | G01Q 10/04 850/3 |
| 2015/0013035 A1* | 1/2015 | Humphris | .............. | G01Q 20/02 850/1 |
| 2015/0034826 A1* | 2/2015 | Prater | ................ | G01N 21/35 250/339.07 |
| 2015/0301079 A1* | 10/2015 | Humphris | .............. | G01Q 20/02 850/6 |
| 2017/0074901 A1* | 3/2017 | Humphris | ............ | G01Q 10/045 |

FOREIGN PATENT DOCUMENTS

| | | |
|---|---|---|
| WO | 2010067129 A1 | 6/2010 |
| WO | 2012104625 A1 | 8/2012 |
| WO | 2013114100 A1 | 8/2013 |

OTHER PUBLICATIONS

T.R. Albrecht et al.: "Microfabrication of cantilever styli for the atomic force microscope," J. Vac. Si. Technol. A 1990, 8(4), pp. 3386-3396.
International Search Report and Written Opinion dated Jun. 2, 2015 International Application No. PCT/EP2015/054128.

* cited by examiner

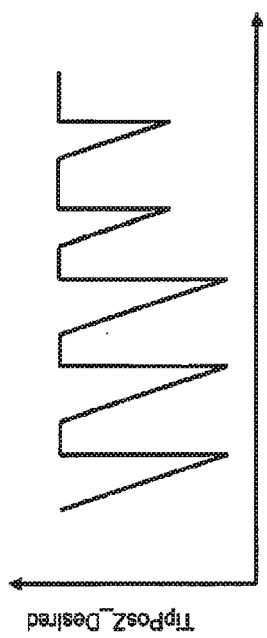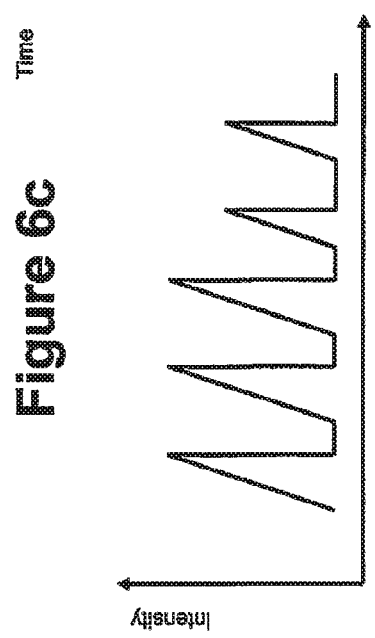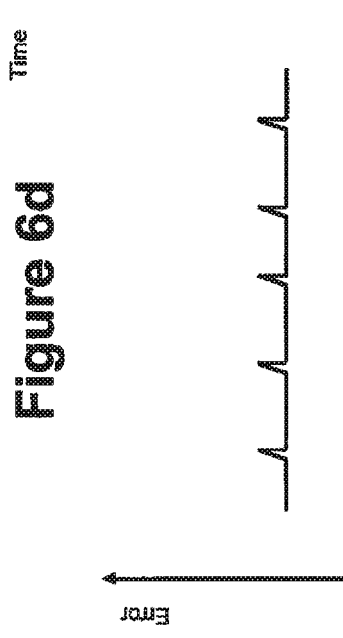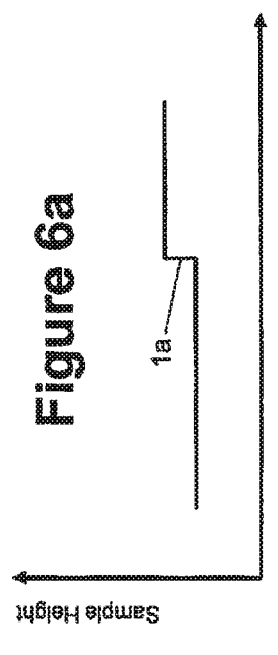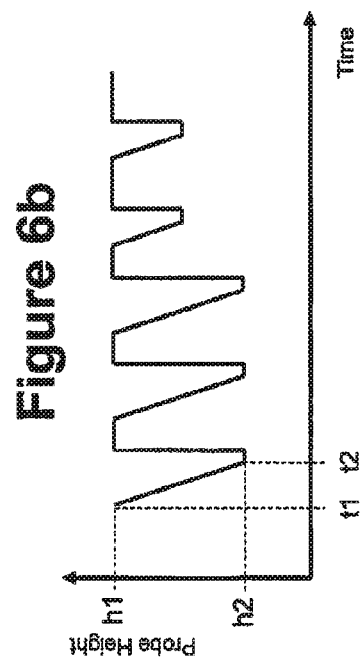

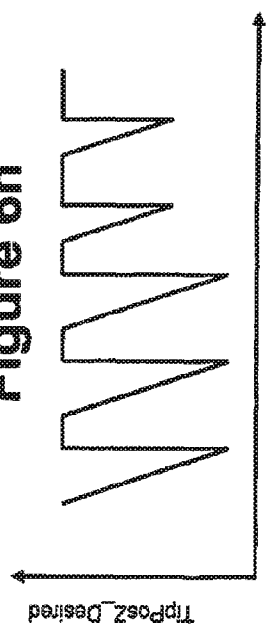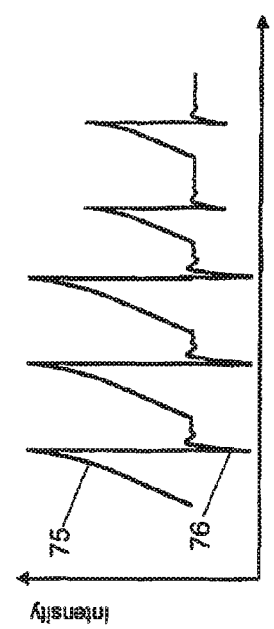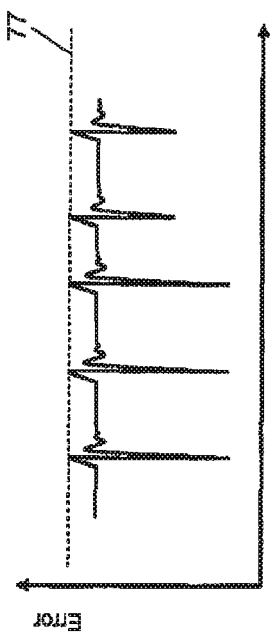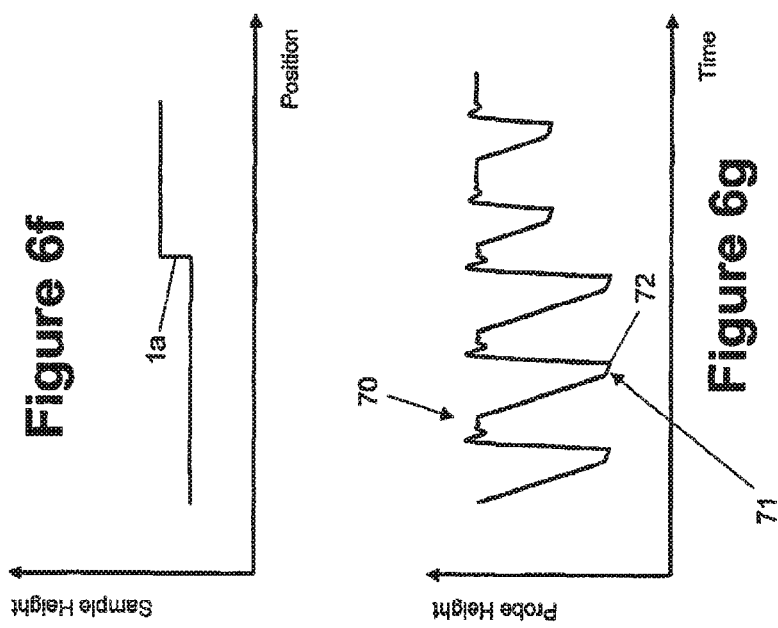

PROBE SYSTEM WITH MULTIPLE ACTUATION LOCATIONS

RELATED APPLICATIONS

The present application is a National Phase of International Application Number PCT/EP2015/054128, filed Feb. 27, 2015, which claims priority from Great Britain Application Number 14157211.5, filed Feb. 28, 2014.

FIELD OF THE INVENTION

The present invention relates to a probe system and associated method.

BACKGROUND OF THE INVENTION

As the feature size of the semiconductor device is becoming increasingly small and the transistor has become three-dimensional, two dimensional characterisation, such as, width and Line Edge Roughness (LER) is no longer sufficient for characterizing these devices. Characteristics based on the three dimensional nature of the device, such as, height, Sidewall Roughness (SWR) and Sidewall Angle (SWA) are increasingly important metrics for these metrology applications. However, it is becoming increasing difficult for current metrology technologies to provide the required three dimensional information about such small structures.

The Atomic force Microscope (AFM) has been widely used for research purposes, and it has also been used in the industry as a metrology tool. One of the main applications of the AFM in metrology is height measurement. However, because most AFMs operate in a top-down configuration, the AFM has limited access to the sidewall of a trench or other structure. This is especially true when the sidewall angle is close to, or greater than 90 degrees. This can be addressed by using novel probe designs and incorporating some degree of lateral motion in the probe tip using piezoelectric actuators or by torsionally vibrating the probe. However this lateral motion may be too slow for in-line metrology applications.

SUMMARY OF THE INVENTION

A first aspect of the invention provides a probe system comprising: a probe with first and second arms and a probe tip carried by the first and second arms, the probe tip having a height and a tilt angle; an illumination system arranged to deform the probe by illuminating the first arm at a first actuation location and the second arm at a second actuation location each with a respective illumination power, and an actuation controller arranged to independently control the illumination power at each actuation location in order to control the height and tilt angle of the probe tip. The first aspect of the invention also provides a method of actuating a probe, the probe comprising first and second arms and a probe tip carried by the first and second arms, the probe tip having a height and a tilt angle, the method comprising: deforming the probe by illuminating each of the arms with a respective illumination power; and independently controlling the illumination power at each arm in order to control a height and tilt angle of the probe tip.

Preferably the first and second arms are mirror images of each other on opposite sides of a plane of symmetry passing through the probe tip.

Optionally the probe further comprises one or more additional arms, and the probe tip is carried by the first, third and additional arms(s). The illumination system is arranged to deform the probe by illuminating the (or each) additional arm at a respective actuation location.

A detection system may be arranged to measure a height of the probe tip only. However more preferably a detection system is provided which not only measures a height of the probe tip to generate a height signal, but also measures a tilt angle of the probe tip to generate a tilt signal.

Optionally the probe system comprises a probe tip support (such as a pad or bridge) joining the first and second arms, and the probe tip support carries the probe tip. The probe tip support may be rectangular, or any other shape (for instance triangular in the case of a V-shaped probe). Alternatively, distal ends of the first and second arms may be connected directly to each other (rather than being connected by a probe tip support) and the probe tip is carried at the junction where the arms meet.

A second aspect of the invention provides a probe system comprising: a probe; a detection system arranged to measure a height of the probe to generate a height signal and also arranged to measure a tilt angle of the probe to generate a tilt signal; an illumination system arranged to deform the probe by illuminating it at first and second actuation locations each with a respective illumination power, and an actuation controller arranged to independently control the illumination power at each actuation location in order to control the height and tilt angle of the probe. The second aspect of the invention also provides a method of actuating and measuring a probe, the method comprising: measuring a height of the probe to generate a height signal; measuring a tilt angle of the probe to generate a tilt signal; deforming the probe by illuminating it at first and second actuation locations each with a respective illumination power, and independently controlling the illumination power at each actuation location in order to control the height and tilt angle of the probe.

Typically the probe comprises a probe tip carried by a tip support structure, and the first and second actuation locations are on the tip support structure. The tip support structure may comprise first and second arms (as in the first aspect of the invention) the illumination system being arranged to illuminate the first arm at the first actuation location and the second arm at the second actuation location. Alternatively the tip support structure may comprise a single arm, the first and second actuation locations being on different parts of that arm. However the use of two arms (as in the first aspect of the invention) is preferred since it enables the arms to be thermally isolated by the air gap between them.

Preferably the tip support structure has a plane of symmetry passing through the probe tip, and the first and second actuation locations are positioned on opposite sides of the plane of symmetry.

Optionally the system further comprises a height controller arranged to generate a desired height value (which may vary with time), and a height feedback controller arranged to receive the height signal from the detection system and the desired height value from the height controller and change the illumination power at both actuation locations according the height signal and the desired height value so that the height signal is driven towards the desired height value. The height feedback controller may be arranged to vary the illumination of the probe according to a difference between the height signal and the desired height value so that the height signal is driven towards the desired height value.

Alternatively the height feedback controller may use a model-based feedback control process.

Optionally the system further comprises a tilt controller arranged to generate a desired tilt value (which may vary with time), and a tilt feedback controller arranged to receive the tilt signal from the detection system and the desired tilt value from the tilt controller and change the illumination power at one or both of the actuation locations according to the tilt signal and the desired tilt value so that the tilt signal is driven towards the desired tilt value. The tilt feedback controller may be arranged to vary the illumination of the probe according to a difference between the tilt signal and the desired tilt value so that the tilt signal is driven towards the desired tilt value. Alternatively the tilt feedback controller may use a model-based feedback control process.

The following comments apply to both aspects of the invention.

The first and second aspects of the invention enable both the height and tilt angle of the probe to be controlled by independently varying the illumination powers at the two locations, enabling both the height and lateral motion of the probe tip to be controlled quickly, accurately and with high resolution. Deformation of the probe is caused by illumination rather than piezoelectric actuation. The deformation may be caused by photothermal heating of the probe, or any other mechanism such as radiation pressure. The deformation of the probe causes the probe to change its height and/or tilt angle which in turn causes the height signal and/or tilt signal to vary.

The tilt signal may be directly indicative of the tilt angle of the probe—for example the tilt signal may be $\text{Tip}\alpha = a\tan((Hb-Ha)/L)$, where L is a distance between two detection points of the detection system, and Hb and Ha are the heights of these two detection points. Alternatively the tilt signal may be indirectly indicative of the Lilt angle of the probe—for example the tilt signal may be a probe tip lateral position signal $\text{TipPosX} = D*((Hb-Ha)/L)$ where D is a length of the probe tip. L is a distance between two detection points of the detection system, and Hb and Ha are the heights of these two detection points.

The probe may be illuminated by the illumination system only at the first and second actuation locations, separate radiation beams forming respective separate illumination spots at the first and second illumination locations. Alternatively the illumination system may illuminate both actuation locations with a single spot with an intensity which varies across the spot.

The probe may be illuminated simultaneously at the first and second actuation locations, or a single actuation beam may be used to generate a flying spot which cycles between the two actuation locations, with the time spent at each location and/or the intensity of the flying spot at each location varying in order to control the illumination power.

Typically the actuation locations are positioned so that changing the illumination power at the first actuation location but not the second actuation location causes a change in the tilt signal, and vice versa.

Simultaneously changing the illumination powers at both actuation locations typically causes a change in the height signal, although in some special cases it may not cause a change in the height signal—for example if the illumination power increases at one actuation location and decreases at the other by the same amount so the two arms bend by the same amount in opposite directions.

In the preferred embodiments of the invention, increasing the illumination power at each actuation location causes the probe to bend in the same direction. Alternatively, increasing the illumination power at one location causes the probe to bend in one direction (for instance towards a sample) and increasing the illumination power at the other location causes the probe to bend in an opposite direction (for instance away from a sample).

Typically the actuation controller is arranged to control the illumination power at the first actuation location in accordance with a first control signal, and to control the illumination power at the second actuation location in accordance with a second control signal which is different than the first control signal. The control signals may be inputs to the actuation controller, or inputs to the illumination system from the actuation controller.

The actuation controller is arranged to independently control the illumination power at each actuation location. That is, it can change the illumination power at the first location independently of the illumination power at the second location, and vice versa. The actuation controller is typically operable to change the illumination power at the first actuation location without simultaneously changing the illumination power at the second actuation, and vice versa. The actuation controller may also be operable to simultaneously change the illumination powers at both actuation locations, by the same amount or by different amounts.

The actuation locations may be positioned so that simultaneously changing the illumination powers at both actuation locations can cause a change in the height signal with substantially no corresponding change in the tilt signal. For instance the two arms of the probe may bend simultaneously in the same direction, causing motion in the height (Z) direction, a small change of tilt angle in a Y-direction (perpendicular to Z) but no change of tilt angle in an X-direction (perpendicular to Y and Z).

Typically the actuation locations are positioned so that increasing the illumination power at the first actuation location but not the second actuation location causes an increase in the tilt signal, increasing the illumination power at the second actuation location but not the first actuation location causes a decrease in the tilt signal, and simultaneously increasing the illumination powers at both actuation locations causes a change in the height signal.

In a preferred embodiment the detection system is arranged to illuminate the probe with radiation at two or more detection locations, receive a reflected beam from each detection location and generate a detection signal for each detection location in accordance with a path difference between the reflected beam and a reference beam, each detection signal being indicative of a height of the probe at a respective one of the detection locations, and the detection system is arranged to derive the height signal from the detection signals. Each detection location may be positioned on a respective one of the arms, or on a probe tip support structure (such as a pad or bridge) which carries the probe tip.

In another embodiment the detection system comprises an illumination system arranged to illuminate the probe with radiation at a detection location; a beam splitter arranged to split a reflected beam from the detection location into a height detection beam and a tilt detection beam; an interferometer arranged to generate the height signal in accordance with a path difference between the height detection beam and a reference beam; and a tilt sensor arranged to receive the tilt detection beam and generate the tilt signal based on an angle of the tilt detection beam. An example of such a detection system is given in WO2009/147450.

In another embodiment the detection system comprises an interferometer and a tilt sensor which detect the height and tilt angle of the probe independently—that is each having its own independent illumination system which illuminates a different part of the probe.

The probe tip typically has a height relative to a height reference and a tilt angle relative to a tilt reference. The height reference may be for example a mount which carries the first and second arms, a sample stage, or an interferometer height detector. Similarly the tilt reference may be for example a mount which carries the first and second arms, a sample stage, or a tilt sensor.

The probe system may be part of a scanning probe device in which the probe is moved relative to a sample (or vice versa) by a scanner to generate a relative scanning motion. Thus the probe system may further comprise a scanner arranged to move the probe relative to a sample (or vice versa) to generate a relative scanning motion.

The probe system may be part of a microscope or other device in which the probe interacts with a sample to measure some property of the sample (for instance its surface topography, material properties such as elasticity or composition). Alternatively the probe may be used to remove or deposit material on a sample or change a sample in some other way.

BRIEF DESCRIPTION OF THE DRAWINGS

Embodiments of the invention will now be described with reference to the accompanying drawings, in which:

FIGS. 6a-e show a preferred mode of operation in schematic form:

FIGS. 6f-j show the preferred mode of operation including probe oscillation, sample indentation, and intensity variation due to feedback control;

DETAILED DESCRIPTION OF EMBODIMENT(S)

Figure 1:
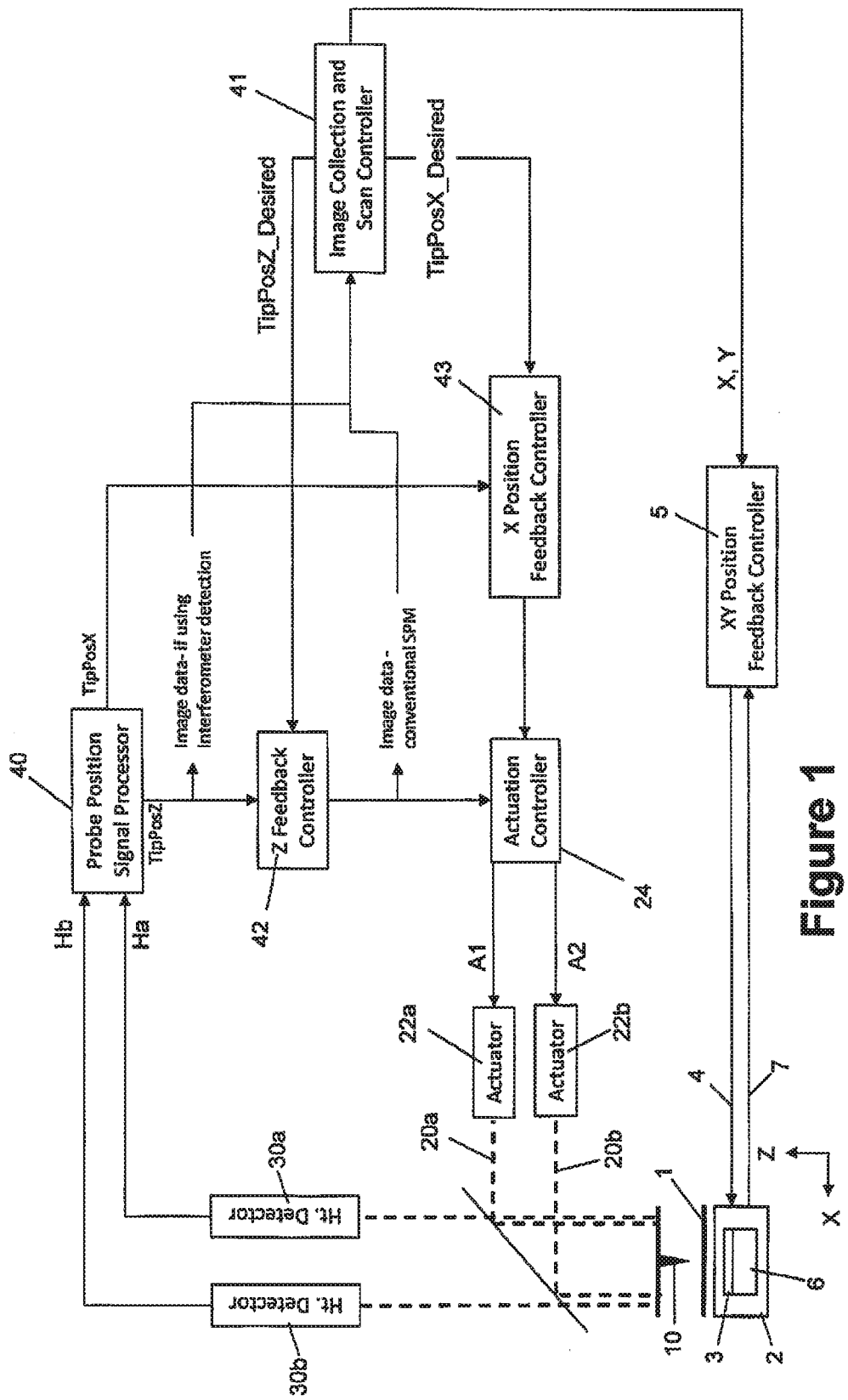
FIG. 1 shows a scanning probe microscope.

FIG. 1 shows a scanning probe microscope for measuring a sample 1 on a stage 2. The stage 2 incorporates a piezoelectric device 3 which can move the stage in a Y-direction (in and out of the plane of FIG. 1) and an X-direction (left and right in FIG. 1) under the control of a control line 4 from an XY position feedback controller 5. The stage 2 also incorporates a sensor 6 such as an interferometer, capacitance sensor or strain gauge sensor for sensing the X and Y position of the stage. The sensor 6 outputs the X and Y positions on a sensing line 7 to the XY position feedback controller 5.

Figure 3:
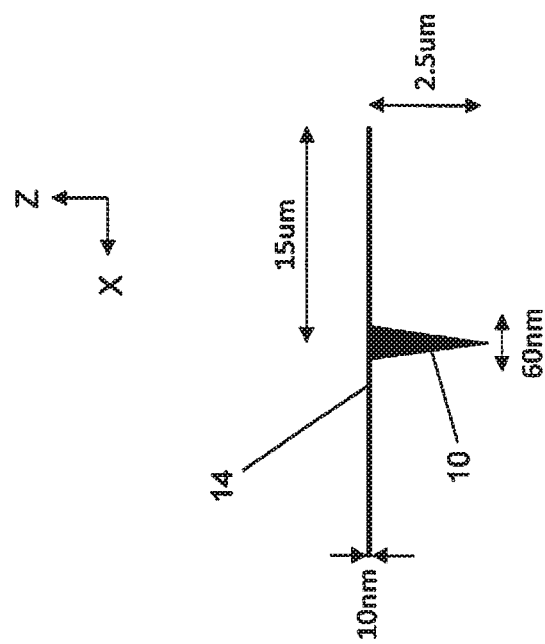
FIG. 3 is an end view of the probe of FIG. 2.
Figure 2:
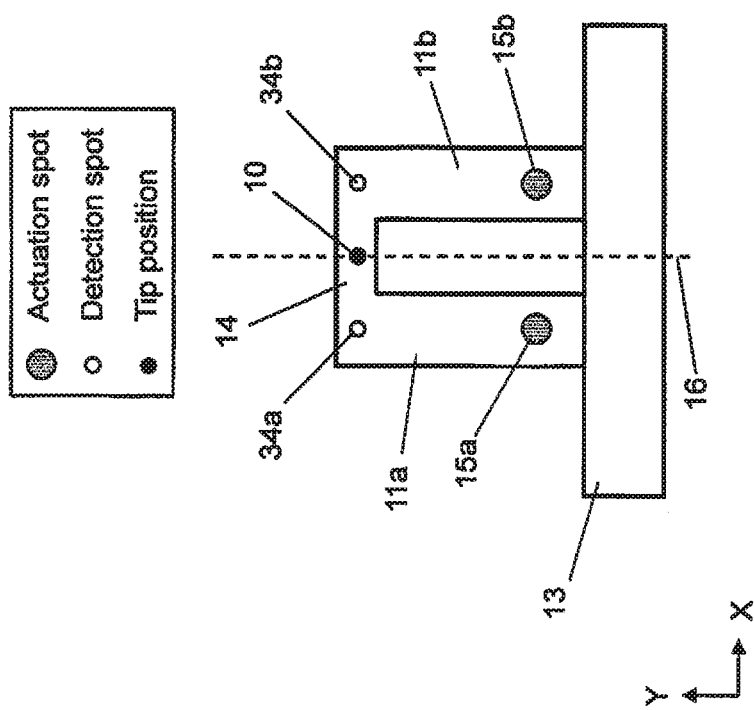
FIG. 2 is a plan view of the probe used in the microscope of FIG. 1.

A probe with a probe tip 10 shown in FIGS. 2 and 3 is mounted above the stage. The probe tip 10 comprises a conical or pyramidal structure that tapers from its base to a point at its distal end that is its closest point of interaction with the sample 1. The probe tip 10 is shown with its axis extending vertically (that is, in the −Z direction based on the frame of reference shown in FIG. 1). The probe tip 10 is carried by a tip support structure comprising first and second cantilever arms 11a,b shown in FIG. 2. Each cantilever arm extends from a cantilever mount 13 with a proximal end carried by the mount and a free distal end remote from the mount. The distal ends of the arms are joined by a bridge 14 which carries the probe tip 10 on its underside.

The arms 11a,b are thermal bimorph structures composed of two (or more) materials, with differing thermal expansions—typically a silicon or silicon nitride base with a gold or aluminium coating. The coating extends the length of the arm and covers the reverse side from the tip 10. An illumination system (in the form of a pair of lasers 22a,b) under the control of an actuation controller 24 is arranged to illuminate the arms on their coated side with respective intensity-modulated first and second radiation spots 15a,b at respective first and second actuation locations.

The arms 11a,b and the bridge 14 are formed from a monolithic structure with uniform thickness. For example the monolithic structure may be formed by selectively etching a thin film of $SiO_2$ or $SiN_4$ as described in Albrecht T., Akamine, S., Carver, T. E., Quate, C. F. J., Microfabrication of cantilever styli for the atomic force microscope, Vac. Sci. Technol. A 1990, 8, 3386 (hereinafter referred to as "Albrecht et al."). The tip 10 may be formed integrally with the arms 11a,b and bridge 14, as described in Albrecht et al., it may be formed by an additive process such as electron beam deposition, or it may be formed separately and attached by adhesive or some other attachment method.

Returning to FIG. 1, the radiation spots 15a,b are generated by respective actuation beams 20a,b which are output from the lasers 22a,b. The actuation controller 24 outputs a first control signal A1 to the laser 22a which controls the illumination power of its laser beam 20a accordingly, and similarly the actuation controller 24 outputs a second control signal A2 to the laser 22b which controls the illumination power of its laser beam 20b accordingly. The two different control signals A1 and A2 independently control the illumination powers at the two actuation locations in order to control the height and tilt angle of the probe tip 10 as described in further detail below.

The tip support structure has a plane of symmetry 16 passing through the probe tip 10, and the spots 15a,b at the first and second actuation locations are symmetrically positioned on opposite sides of the plane of symmetry 16.

The wavelength of the actuation beams is selected for good absorption by the coating, so that each radiation spot heats the coating of its respective arm and the arm bends along its length and moves the probe tip 10. In this example the coating is on the reverse side from the sample so each arm bends towards the sample when heated, but alternatively the coating may be on the same side as the sample so each arm bends away from the sample when heated. In a further alternative embodiment the coatings for the two arms may be on opposite sides: that is, the coating on arm 11a may be on its upper side (the reverse side from the sample) so the arm 11a bends towards the sample when heated, and the coating on arm 11b is on its lower side (the same side as the sample) so the arm 11b bends in an opposite direction away from the sample when heated.

A pair of interferometer height detectors 30a,b are arranged to measure heights of the probe at two spaced apart detection locations via detection spots 34a,b at first and second detection locations symmetrically positioned on opposite sides of the plane of symmetry 16. The detectors 30a,b are shown schematically in FIG. 1, and FIG. 4 shows one of the interferometers 30a in more detail (the other interferometer 30b being identical).

Figure 4:
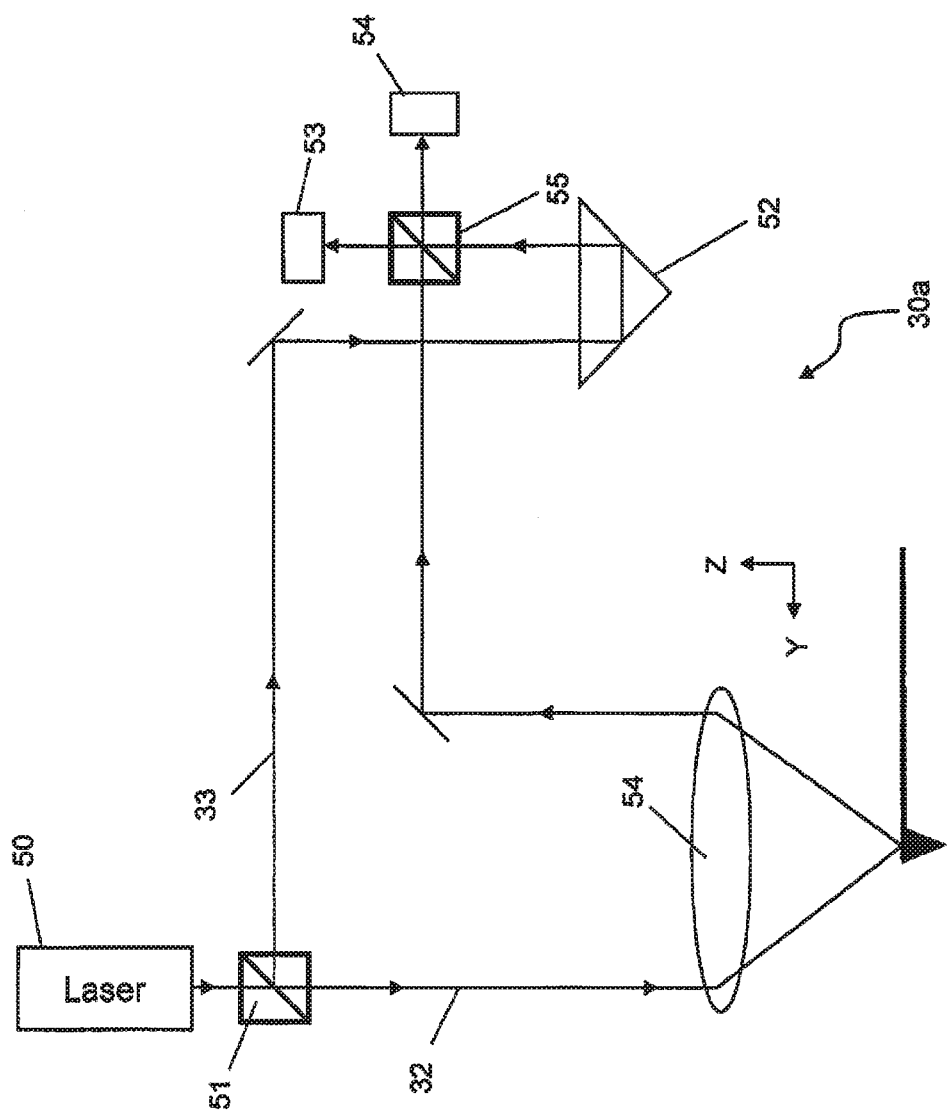
FIG. 4 shows an interferometer detection system.

Referring to FIG. 4—light from a source 50 is split by a beam splitter 51 into a detection beam 32 and a reference beam 33. The detection beam 32 is focused by an objective lens 54 onto the back of the probe. After reflection from the probe, the reflected detection beam is directed to a beam splitter 55. The reference beam 33 is directed to the beam splitter 55 via a retro-reflector 52.

The beam splitter 55 has an energy absorbing coating and splits both detection and reference beams to produce first and second interferograms with a relative phase shift of 90 degrees. The two interferograms are detected respectively at photodetectors 53, 54.

Ideally, the photodetector signals are complementary sine and cosine signals with a phase difference of 90 degrees. Further, they should have no dc offset, have equal amplitudes and only depend on the position of the cantilever and wavelength of the laser 10. Known methods are used to monitor the outputs of the photodetectors 53, 54 while changing the optical path difference in order to determine and to apply corrections for errors arising as a result of the two photodetector signals not being perfectly harmonic, with equal amplitude and in phase quadrature. Similarly, dc offset levels are also corrected in accordance with methods known in the art.

These photodetector signals are suitable for use with a conventional interferometer reversible fringe counting apparatus and fringe subdividing apparatus, which may be provided as dedicated hardware or as a programmed computer. Phase quadrature fringe counting apparatus is capable of measuring displacements in the position of the cantilever to an accuracy of $\lambda/8$. That is, to 66 nm for 532 nm light. Known fringe subdividing techniques, based on the arc tangent of the signals, permit an improvement in accuracy to the nanometer scale or less.

Interferometric methods of extracting the path difference between two coherent beams are well known in the art and so will not be described in any further detail.

The interferometer described herein is one example of a homodyne system. The particular system described offers a number of advantages to this application. The use of two phase quadrature interferograms enables the measurement of cantilever displacement over multiple fringes, and hence over a large displacement range. The use of a phase-shifting coating on the beamsplitter 55 reduces the interferometer's sensitivity to polarisation effects, for example arising from changes in polarisation as the detection beam is reflected from the cantilever. Examples of an interferometer based on these principles are described in U.S. Pat. No. 6,678,056 and WO2010/067129. Alternative interferometer systems capable of measuring a change in optical path length may also be employed with this invention, for example, a homodyne interferometer could be implemented using polarization methods to generate the two phase quadrature interferograms or a heterodyne interferometer implemented by using a dual frequency laser. A suitable homodyne polarisation interferometer is described in EP 1 892 727 and a suitable heterodyne interferometer is described in U.S. Pat. No. 5,144,150 which could be adapted for use with this invention.

Thus measured height signals Ha, Hb for each detection location are generated by the height detectors 30a,b in accordance with a path difference between the detection beam 32 reflected from the detection location and the reference beam 33. The radiation spots generated by the detection beams 32 at the two detection locations are labelled 34a,b in FIG. 2.

Returning to FIG. 1, the measured height signals Ha, Hb are input into a probe position signal processor 40 which generates a probe tip height signal TipPosZ=(Ha+Hb)/2 which is indicative of a height of the tip of the probe, a tilt signal Tipα=a tan((Hb−Ha)/L) which is indicative of a tilt angle of the probe, where L is the distance between the detection spots 34a,b, and a probe tip lateral position signal TipPosX=D*((Hb−Ha)/L) where D is the length of the probe tip 10. This calculation of TipPosX assumes that the tip is halfway between the two detection spots 34a,b. Other geometries are possible but will affect the calculation of TipPosX.

TipPosZ indicates a measured position of the probe in a direction (Z) perpendicular to the surface of the sample and TipPosX indicates a measured position of the probe in a lateral direction (X) parallel to the surface of the sample.

Note that these signals TipPosZ, TipPosX and Tipα only approximately indicate the height and tilt angles for the probe, but this is an approximation which is reasonably accurate for small changes in height, X-position and tilt angle.

When the probe is illuminated simultaneously by both actuation spots 15a,b with the same illumination power, the arms 11a,b bend down by the same amount so that the probe moves towards the sample (in the ZY plane—essentially in the Z direction for small angles) and causes a change in the height signals Ha, Hb and TipPosZ, but essentially no change in Tipα or TipPosX.

When the probe is illuminated by the spot 15a with a greater illumination power than the other spot 15b, then the probe tilts clockwise (from the viewpoint of FIG. 3) and causes a negative change in the tilt signal Tipα and the lateral position signal TipPosX. Similarly, when the probe is illuminated by the spot 15b with a greater power than the other spot 15a, then the probe tilts anti-clockwise (from the viewpoint of FIG. 3) and causes a positive change in the tilt signal Tipα and the lateral position signal TipPosX. Note that the motion of the probe will not be a pure rotation, so it will also cause a certain amount of change in the probe height and hence TipPosZ, but this change of height can be assumed to be negligible for small angles of tilt and can be compensated for by introducing an additional height adjustment.

Returning to FIG. 1, the height signal TipPosZ is output to a Z position feedback controller 42 which provides a cantilever beam Z-control signal to the actuation controller 24. Similarly the lateral position signal TipPosX is output to an X position feedback controller 43 which provides a cantilever beam X-control signal to the actuation controller 24.

An image may be generated in one of two ways. In one example (using interferometer detection) the height signal TipPosZ is output to an image collection and scan controller 41 which compiles an image based on variation of TipPosZ over the course of a scan. In another example (similar to a conventional Scanning Probe Microscope (SPM)) the cantilever beam Z-control signal is instead output to the controller 41 for image compilation.

Overall control of the process is co-ordinated by the controllers 41-43 described above. The controller 41 is arranged to generate a desired value (TipPosZ_Desired) for the height signal TipPosZ, and a desired value (TipPosX_Desired) for the lateral position signal TipPosX. The desired values (TipPosZ_Desired, TipPosX_Desired) effectively represent desired positions of the probe—TipPosZ_Desired representing a desired position of the probe in a direction (Z) perpendicular to the surface of the sample and TipPosX_Desired representing a desired position of the probe in a direction (X) parallel to the surface of the sample. Each one of these desired values (TipPosZ_Desired, TipPosX_Desired) varies with time. If the probe is to be moved to the desired height value TipPosZ_Desired—or equivalently a desired interaction level with the sample—and/or the desired lateral position TipPosX_Desired then the controller 41 inputs TipPosX_Desired and TipPosZ_Desired into the feedback controllers 42, 43. The Z feedback controller 42 monitors the height signal TipPosZ compared with TipPosZ_Desired and determines the cantilever beam Z-control signal which it outputs to the actuation controller 24. When the cantilever beam Z-control signal changes by ΔZ then the actuation controller 24 changes the illumination powers at both actuation locations according to ΔZ so that the measured height signal TipPosZ is driven towards the desired height value TipPosZ_Desired. Similarly the X feedback controller 43 monitors the lateral position signal TipPosX compared with TipPosX_Desired and determines the cantilever beam X-control signal which it outputs to the actuation controller 24. When the cantilever beam X-control signal changes by ΔX then the actuation controller 24 changes the difference between illumination powers at the actuation locations according to ΔX so that the measured lateral position signal TipPosX is driven towards the desired lateral position TipPosX_Desired.

When the probe is to be moved in both Z and X the actuation controller 24 causes the laser 22a to change its intensity A1 by an amount (ΔZ+ΔX/2) and the laser 22b to change its intensity A2 by an amount (ΔZ−ΔX/2).

Note that rather than having two independent X and Z feedback controllers 42, 43, the two feedback controllers 42, 43 may be integrated into a single feedback control unit which controls both the X position and the Z position. Integrating into a single feedback controller may be preferred if compensation for coupling between X and Z is required.

A preferred mode of operation will now be described with reference to FIGS. 5a and 6a-j. FIG. 6a shows the profile of the sample 1 with a step 1a. The controller 41 incorporates a waveform generator 41b shown in FIG. 5a which generates a waveform shown in FIG. 6c. As noted above, the desired value TipPosZ_Desired shown in FIG. 6c varies with time. The waveform causes the probe to follow a cyclic back and forth motion set at a frequency that is lower than the resonant frequency of the probe. The waveform may be periodic as in FIG. 6c or aperiodic, provided that it repeatedly brings the tip towards and then away from the sample surface as shown in FIG. 6b. In other words, the cycles of the back and forth motion of the tip may be spaced apart in time by a constant time period, or they may be spaced apart by a time period which is not constant—for instance in order to sample different points spaced apart irregular intervals across the surface of the sample rather than sampling a regularly spaced grid of pixels.

During the course of a measurement the probe is moved towards the sample surface at a constant speed until the surface is detected by a surface detector 41a (described in further detail below) at which point the probe is retracted and the height signal TipPosZ is recorded at the point of surface detection. An image (i.e. a map of measurements) of the surface height is then created by repeating this process while moving the sample laterally under control of the piezoelectric device 3, generally following a raster pattern although any x,y sequence could be followed.

The operation of the feedback controllers 42, 43 will now be described with reference to the mode of operation shown in FIGS. 6a-j. If the probe is to be moved to a desired height value TipPosZ_Desired and/or a desired lateral position TipPosX_Desired then the controller 41 inputs TipPosX_Desired and TipPosZ_Desired into the feedback controllers 42, 43.

In this example TipPosZ_Desired varies back and forth with time as shown in FIG. 6c, decreasing at a constant rate as the probe moves towards the sample at a constant speed. The scan controller 41 comprises a memory 41c containing probe height control data, and is arranged to generate TipPosZ_Desired in accordance with this probe height control data and the output of the surface detector 41a. The probe height control data defines the required back and forth motion of the probe in the Z direction—for instance defining the speed of approach towards the sample, the maximum amplitude of motion and the repeat period of the motion. Alternatively probe height control data may define an algorithm which enables TipPosZ_Desired to be calculated on the fly during the scanning of the sample. In either case the probe height control data is predefined in the sense that it has been stored in the memory 41c before the performance of the method, rather than being generated on the fly during the scanning of the sample.

In order to ensure such a constant speed of approach towards the sample, the Z feedback controller 42 monitors the height signal TipPosZ compared with the time-varying signal TipPosZ_Desired and determines the difference which it outputs as an error signal (shown in FIG. 6e) to a proportional-integral-derivative (PID) feedback controller 42a. The PID feedback controller generates the cantilever beam Z-control signal in accordance with the error signal which it outputs to the actuation controller 24. Then the actuation controller 24 changes the illumination powers at both actuation locations according to any change ΔZ in the cantilever beam Z-control signal so that the measured height signal TipPosZ is driven towards the desired height value TipPosZ_desired. The variation in illumination power is shown in FIG. 6d.

Optionally a z positioning system (not shown) may control the height of the cantilever mount 13 or the sample 1 and be operated to maintain the probe cyclic amplitude at a set average level, where the "probe cyclic amplitude" is the height difference for each cycle between the fully retracted position and the point of surface detection. An example of this optional arrangement is shown in FIG. 5b which shows an alternative embodiment which is similar to FIG. 5a except it also includes a piezoelectric base positioning system 60 which can move the cantilever mount 13 up and down in the vertical (Z) direction by a larger amount than the photothermal actuation system 22a, 22b, 24. Typically the positioning system 60 can move the cantilever mount 13 by a maximum distance of the order of 5 μm ($5*10^{-6}$ m) which is about ten times more than the maximum range of movement provided by the photothermal actuation system 22a, 22b, 24. An additional PID feedback controller 61 controls the Z position of the cantilever mount 13 to maintain the probe within the range of the photothermal actuation system 22a, 22b, 24.

Figure 5A:
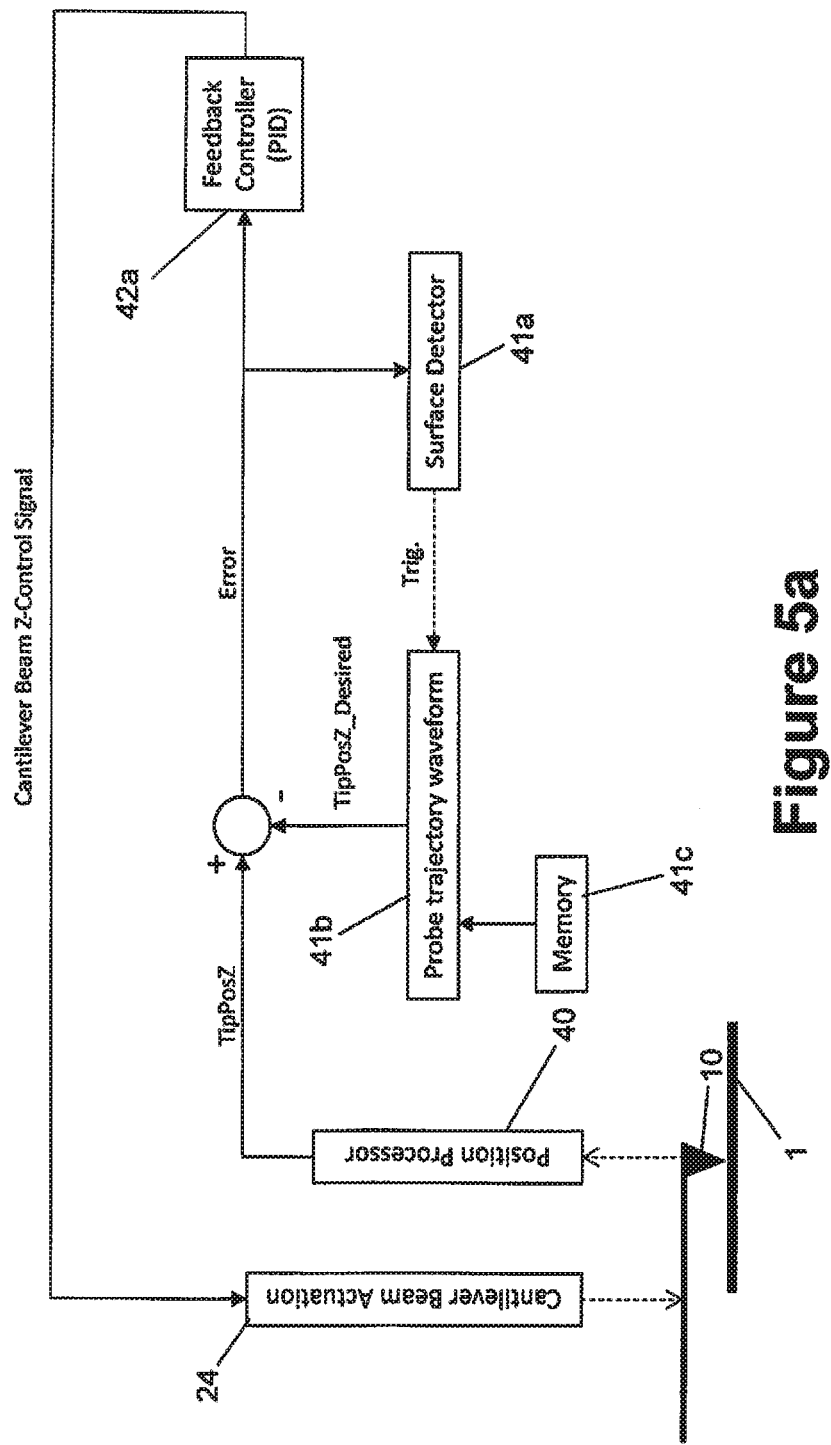
FIG. 5a shows further details of the control system in the microscope of FIG. 1.
Figure 5B:
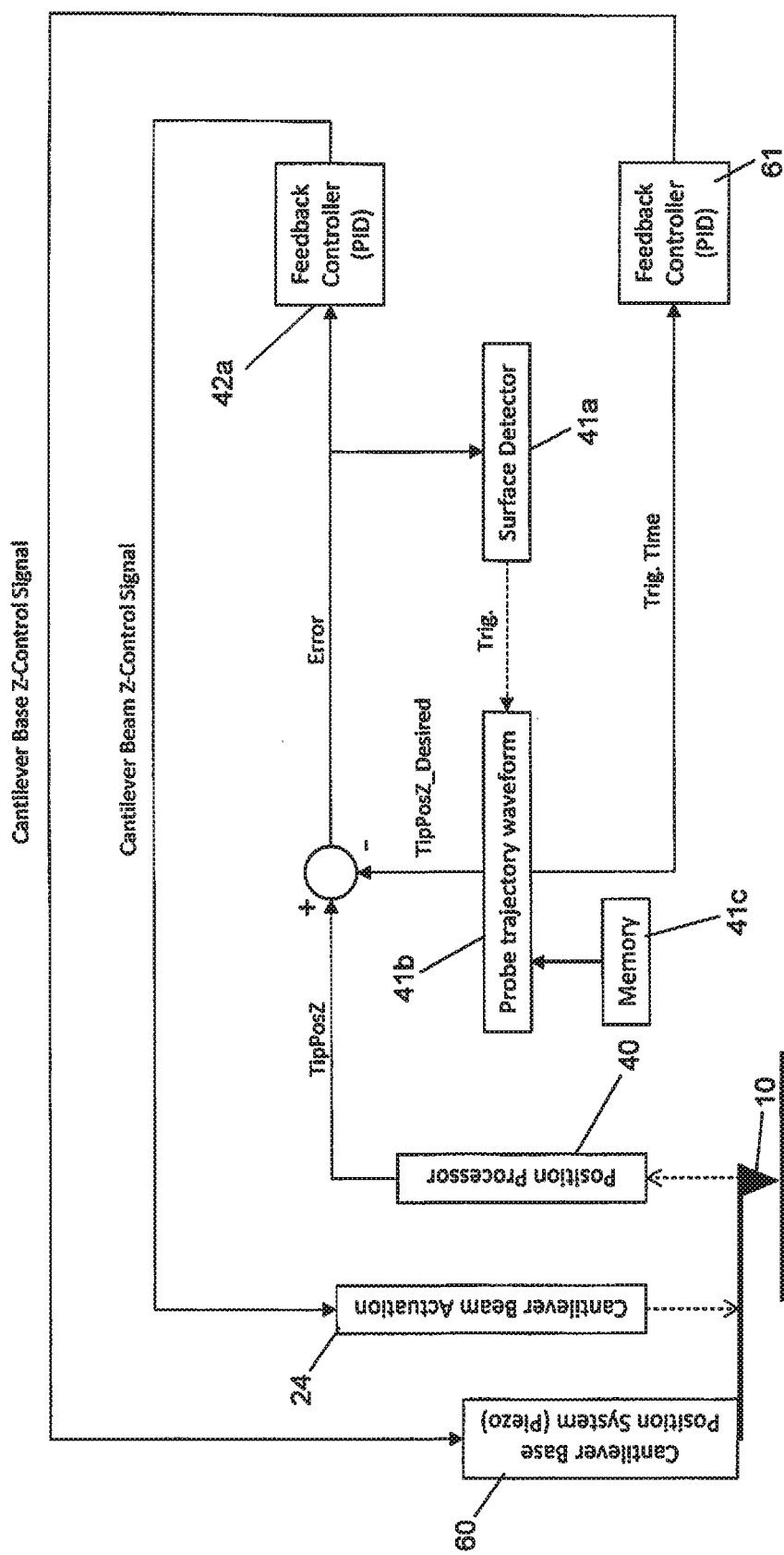
FIG. 5b shows an alternative feedback control system.
Figure 5C:
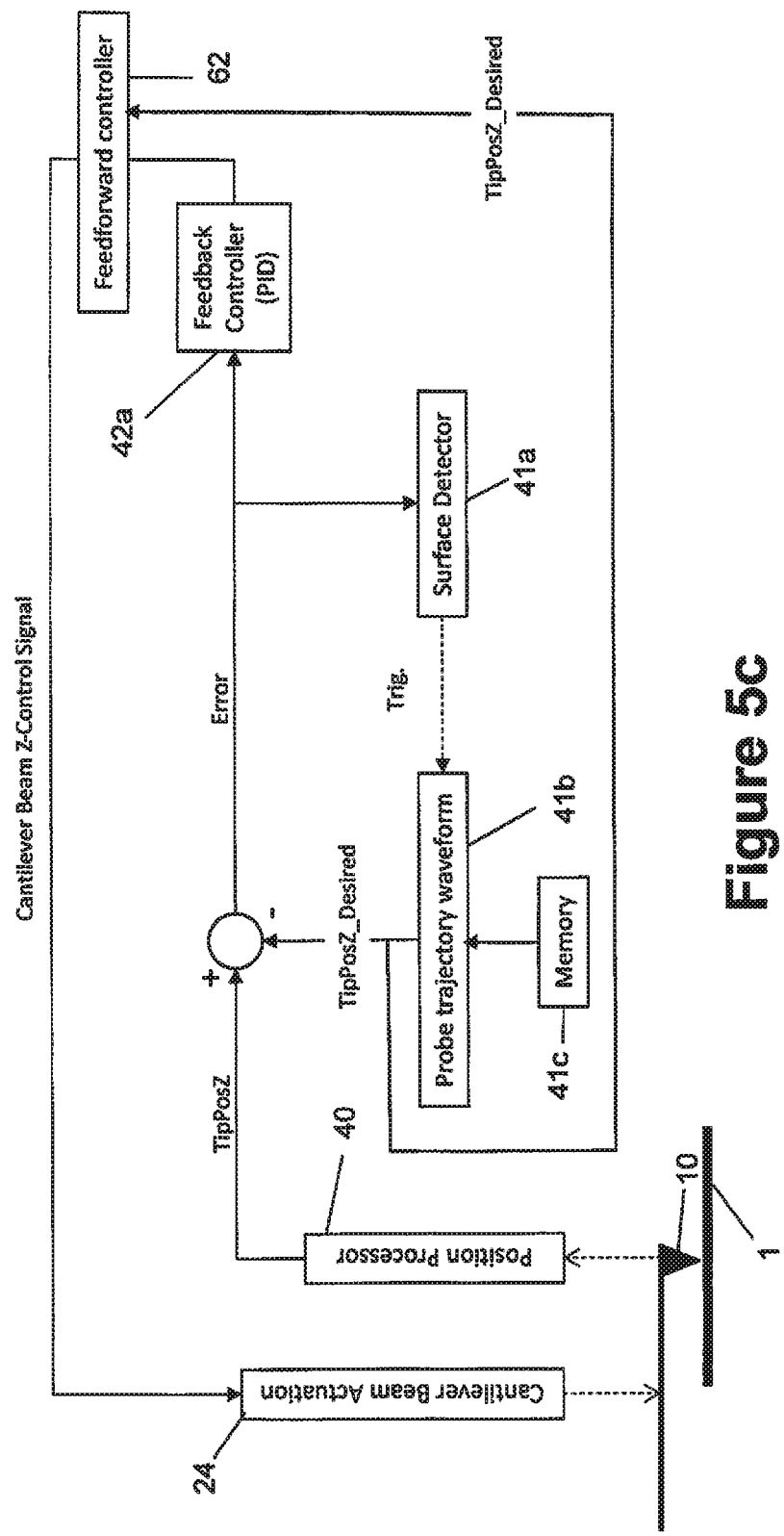
FIG. 5c shows a feedback control system combined with feedforward control.

FIG. 5c shows a further alternative embodiment which is similar to FIG. 5a except it also includes a feedforward controller 62 as well as a feedback controller. Note that FIG.

5c is only schematic and the loop connections could be more complex. The feedforward controller 62 provides a form of model based feedback, in that feedforward uses an inverse of the probe/tip dynamic transfer function to extend the overall frequency response. This could address thermal, optical and mechanical dynamics. The feedforward approach is known, for instance in Pao, L. Y., Butterworth, J. A., and Abramovitch, D. Y., 2007, "Combined Feedforward/Feedback Control of Atomic Force Microscopes," Proceedings of the 2007 American Control Conference, New York, N.Y., July 11-13, pp. 3509-3515, and also in Clayton et al., 2009, "A Review of Feedforward Control Approaches in Nanopositioning for High-Speed SPM", *Journal of Dynamic Systems, Measurement, and Control*, 131:6, 061101.

The surface detector 41a provides an indication of the point in the cycle at which the probe tip interacts with the sample surface. In the embodiments of FIGS. 5a-c the input to the surface detector 41a is the error signal (FIG. 6e) from the Z feedback controller, and the surface position is extracted by the surface detector 41a from the point within each cycle at which the error signal exceeds a threshold for a set period of time. Alternatively the probe could be oscillated at resonance with a small amplitude and high frequency to provide a "dithering" motion which is superimposed on the larger amplitude and lower frequency waveform shown in FIG. 6c. The surface detector monitors the phase, amplitude or frequency of this dithering motion within the signal TipPosZ and detects that the probe is at a surface position when the phase, amplitude or frequency changes significantly. In this case the high frequency dithering motion is filtered from the signal TipPosZ to generate an average TipPosZ signal, and this average TipPosZ signal is input into the feedback controller and compared with the time-varying signal TipPosZ_Desired to generate the error signal. Alternatively, rather than using an average TipPosZ signal, the maximum or minimum points of the dithering motion may be input into the feedback controller and compared with the time-varying signal TipPosZ_Desired to generate the error signal.

In another example (not shown) the input to the surface detector 41a could be the signal TipPosZ from the position processor 40. The probe velocity, or equivalently rate of change of the height signal, will fall as the tip encounters and begins to interact with the surface. An indication of the surface position is therefore extracted from the point within each cycle at which the rate of change of TipPosZ falls below a threshold for a set period of time.

Once the point of surface detection is determined, the surface detection unit 41a sends a trigger signal to the waveform generator 41b. In response, the waveform generator 41b modifies its output (TipPosZ_Desired) in order to retract the tip away from the sample.

The value of TipPosZ at the time of surface detection gives an indication of the height of the probe at which it interacts with the surface within each period of a probe cycle. That is, it provides a measure of surface height at the probe's x,y position that can be used to construct an image. Each data point, representing a measured surface height, is mapped to the scan x,y position and so forms a point or pixel on the image. Optionally multiple measurements of surface height may be used to form each pixel.

The image can be based on the height h2 (shown in FIG. 6b) of the probe at which it detects or interacts with the surface in each period of probe cycle. Alternatively, it could be based on the time t2−t1 (also shown in FIG. 6b) which the probe takes to reach the surface position from its fully retracted position. Since the height h1 of the fully retracted position and the rate of approach v of the probe tip towards the sample are known, the height h2 can be calculated as: h2=h1−v1*(t2−t1).

The height signal TipPosZ can also be monitored over a period of time during which the probe is interacting with the sample to generate elasticity data or other material data indicative of a material property of sample, and that material data used to form an image. This is illustrated in FIG. 6g which is a more realistic representation of the probe height during the traversal of the step 1a, this time including oscillation and ringing down of the probe during the retraction phase 70, and a gradual reduction in tip height as it becomes indented into the sample at 71 before it is retracted at 72. FIG. 6i is similar to FIG. 6d but includes the intensity variation caused by the Z-feedback controller 42 responding to the oscillation of the probe. Specifically the intensity variation 75 during the approach phase is not linear (unlike FIG. 6d) and the intensity drops close to zero at 76 in order to rapidly retract the probe. FIG. 6j also shows oscillations in the error signal, and the value of the trigger threshold 77 used by the surface detector 41a.

An image of the sample is typically created by moving the tip relative to the sample in a raster pattern. The required lateral (X) position of the probe relative to the sample is a "triangle-wave" back and forth motion to achieve a fast raster scan with constant velocity and an instantaneous reversal of direction at the opposite edges of the scan area. The fundamental frequency of this scanning motion is achieved by the piezoelectric device 3 which generates a sinusoidal movement of the stage at the necessary frequency in the X-direction. The higher frequency X-motion is driven by the lasers 22a,b which tilt the probe back and forth. Therefore TipPosX_Desired varies periodically over time as the probe raster scans across the sample. The scan controller 41 comprises a memory (not shown) containing probe lateral position control data, and it is arranged to vary TipPosX_Desired in accordance with this probe lateral position control data. So just as the desired value TipPosZ_Desired varies with time as shown in FIG. 6c, the desired value TipPosX_Desired also varies with time (as a triangle wave).

The X feedback controller 43 has a similar mode of operation to the Z feedback controller shown in FIG. 5 and generates a cantilever beam X-control signal which is output to the actuation controller 24. The actuation controller 24 then changes the difference between illumination powers at the actuation locations so that the measured lateral position signal TipPosX is driven towards the desired lateral position TipPosX_Desired.

In the examples above the controller 41 inputs TipPosX_Desired into the feedback controller 43, so the desired value represents a desired lateral position of the probe as measured by TipPosX. Alternatively the controller 41 may input a desired value Tipα_Desired into the feedback controller 43, so the desired value represents a desired tilt angle of the probe as measured by Tipα.

Figure 7:
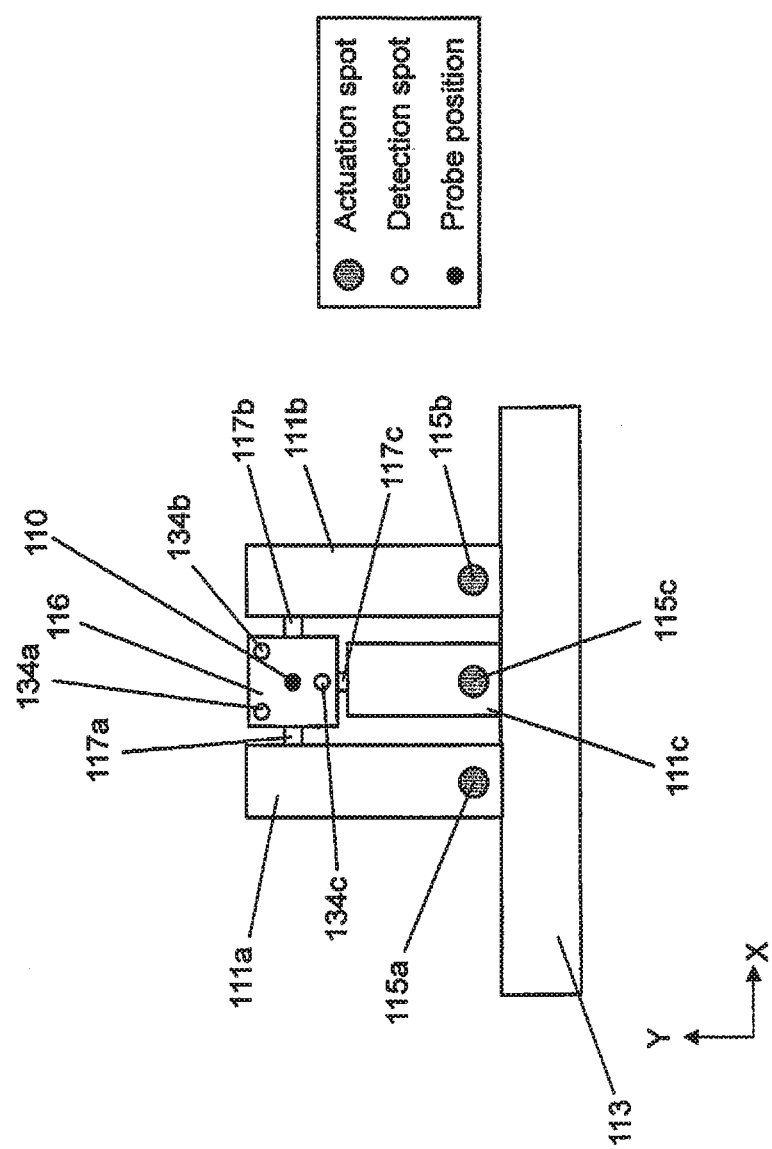
FIG. 7 is a plan view of an alternative probe with three cantilever arms.

FIG. 7 shows an alternative probe comprising a probe tip 110 carried by three cantilever arms 111a-c. Each cantilever arm extends from a cantilever mount 113 with a proximal end carried by the mount and a free distal end remote from the mount. A pad 116 carries the probe tip 110 on its underside. The side arms 111a,b are coupled to opposite sides of the pad by hinge members 117a,b and the central arm 111c is coupled to the pad by a hinge member 117c. The arms 111a-c, hinges 117a-c and pad 116 are formed from a monolithic structure, typically with uniform thickness although optionally the hinges 117a-c may be thinner than the arms 111a-c and pad 116.

The side arms 111a,b are operated in a similar fashion to the arms 11a,b in the first embodiment. That is: when the side arm 111a is illuminated by the spot 115a with greater power than the other side arm then the pad tilts clockwise, and when the side arm 111b is illuminated by the spot 115b with greater power than the other side arm then the pad tilts anti-clockwise. The central arm 111c gives a further degree of control: when the intensity of the spot 115c changes (without changing the intensity of the side spots 115a,b) then it bends and causes the pad to tilt in the Y direction.

Figure 8:
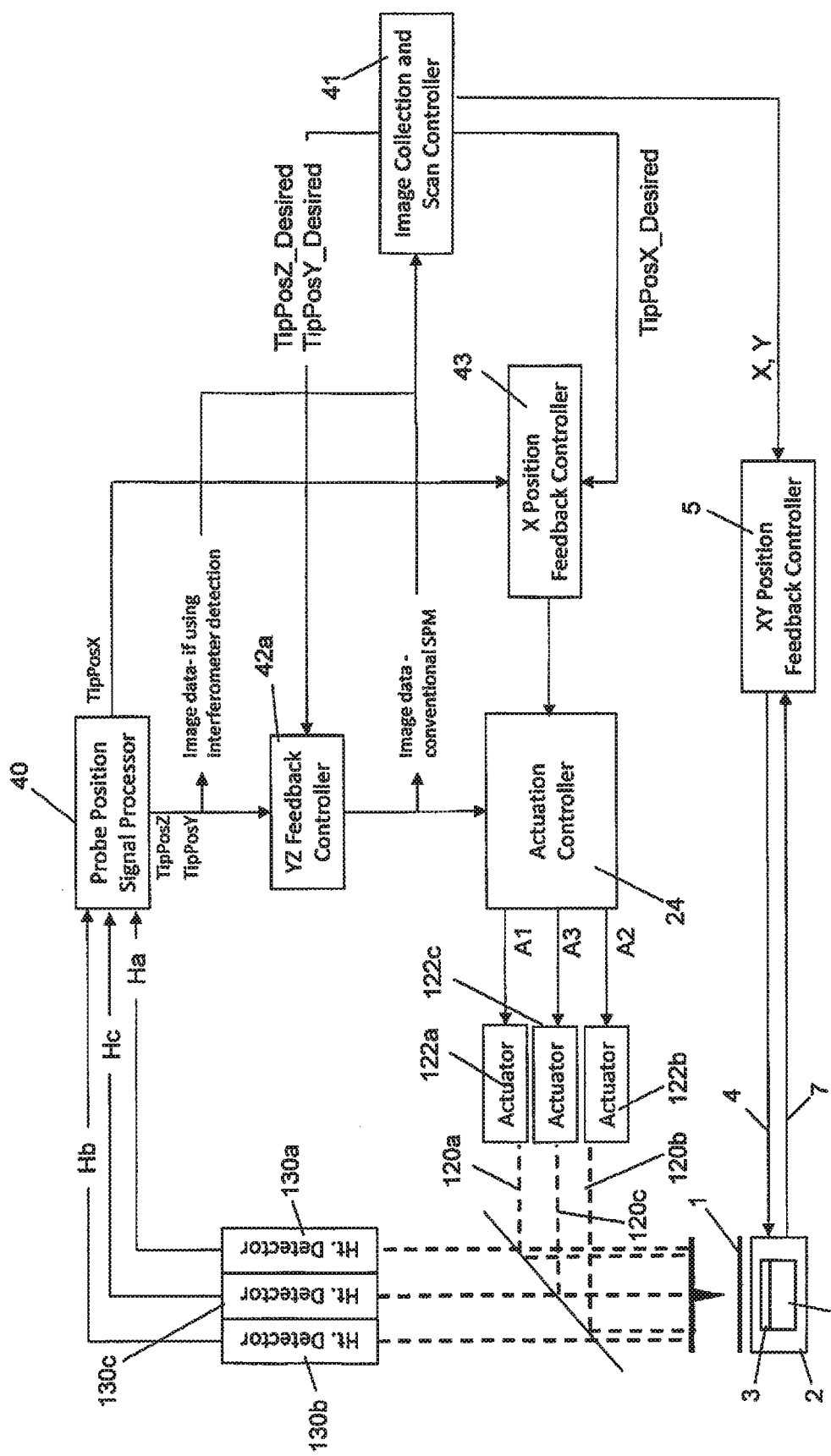
FIG. 8 shows a scanning probe microscope incorporating the probe of FIG. 7.

FIG. 8 shows a scanning probe microscope incorporating the probe of FIG. 7. Three actuation lasers 122a-c with output beams 120a-c generate the actuation spots 115a-c respectively. Three interferometer height detectors 130a-c are arranged to measure heights of the probe at three detection locations on the pad 116 indicated by detection spots 134a-c in FIG. 7. Each height detector 130a-c operates in the same manner as the interferometer shown in FIG. 4. Height signals Ha, Hb, Hc are sampled with detection spots 134a-c respectively. The detection spots 14a-c are located on the circumference of a circle centred on the probe tip 110 with radius r and thus with angular separation 120 deg.

The sampled heights Ha, Hb, Hc are input into a probe position signal processor 40 which generates a probe tip height signal TipPosZ=(Ha+Hb+Hc)/3 which is indicative of a height of the tip of the probe, an X-tilt signal Tipα=a tan ((Hb−Ha)/(sqn(3)×r)) which is indicative of a tilt angle of the probe in the X direction, and a Y-tilt signal Tipγ=a tan ((Ha+Hb−2×Hc)/(3×r)) which is indicative of a tilt angle of the probe in the Y direction.

The position signal processor 40 also generates an X-position signal TipPosX and a Y-position signal TipPosY which are input into the X Position Feedback controller 43 and a YZ Feedback controller 42a respectively. The X-position signal TipPosX and Y-position signal TipPosY are calculated based on the length of the probe tip in a similar fashion to TipPosX in the embodiment of FIG. 1.

The Z feedback controller 42 of FIG. 1 is replaced by a YZ feedback controller 42a which operates a feedback loop to position the probe so that it follows a desired trajectory in Y TipPosY_Desired as well as a desired trajectory in Z TipPosZ_Desired.

Figure 9:
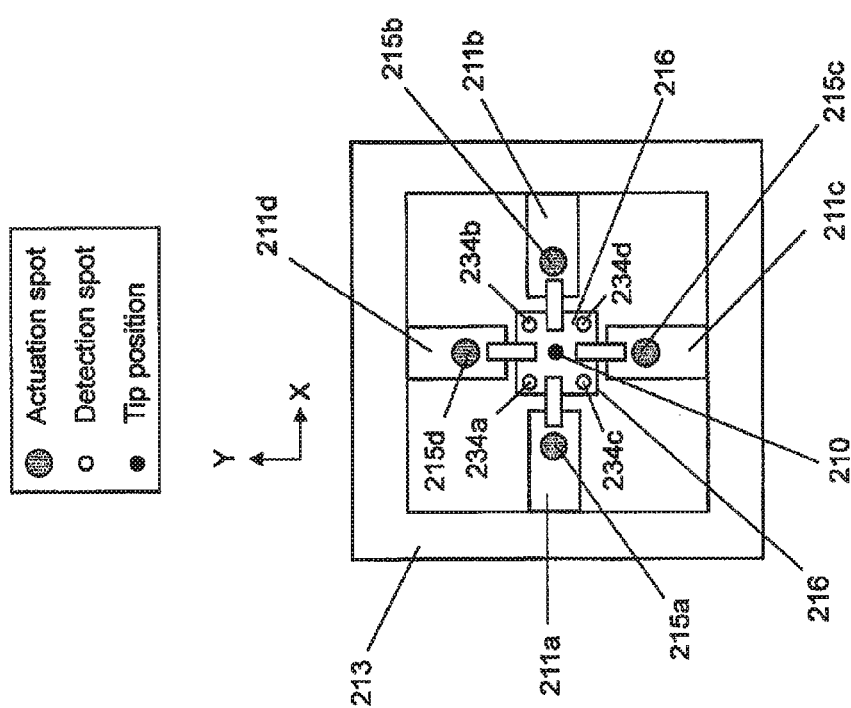
FIG. 9 is a plan view of square "picture frame" probe.

FIG. 9 is a plan view of a probe according to a further embodiment of the present invention. The probe comprises a square "picture frame" mount 213 and four cantilever arms 211a-d. Each cantilever arm extends from the mount 213 with a proximal end carried by the mount and a free distal end remote from the mount. A pad 216 carries the probe tip 210 on its underside. The side arms 211a,b are coupled to opposite sides of the pad by respective hinge members and the central arms 111c,d are coupled to the pad by respective hinge members. The arms 211a-d, hinge members and pad 216 are formed from a monolithic structure, typically with uniform thickness although optionally the hinge members may be thinner than the arms 211a-d and pad 216.

The side arms 211a,b are operated in a similar fashion to the arms 11a,b in the first embodiment. That is: when the side arm 211a is illuminated by the spot 215a with greater power than the spot 215b on the opposite side arm then the pad tilts clockwise in the X direction, and when the side arm 211b is illuminated by the spot 215b with greater power then the pad tilts anti-clockwise in the X direction. Similarly, when the central arm 211c is illuminated by the spot 215c with greater power than the other central arm 211d then the pad tilts clockwise in the Y direction, and when the central arm 211d is illuminated by the spot 215d with greater power than the other central arm 211c then the pad tilts anti-clockwise in the Y direction.

Sampled height signals Ha, Hb, Hc, Hd from detection spots 234a-d respectively on the four arms are input into the probe position signal processor 40 which generates a probe tip height signal TipPosZ=(Ha+Hb+Hc+Hd)/4 which is indicative of a height of the tip of the probe, an X-tilt signal Tipα=a tan((Hb+Hd−Ha−Hc)/2L) which is indicative of a tilt angle of the probe in the X direction (as well as a related X-position signal TipPosX), and a Y-tilt signal Tipγ=a tan ((Ha+Hb−Hc−Hd)/2L) which is indicative of a tilt angle of the probe in the Y direction (as well as a related X-position signal TipPosX), where L in the above equations is the side length of the square joining the centres of the four detection spots.

Figure 10:
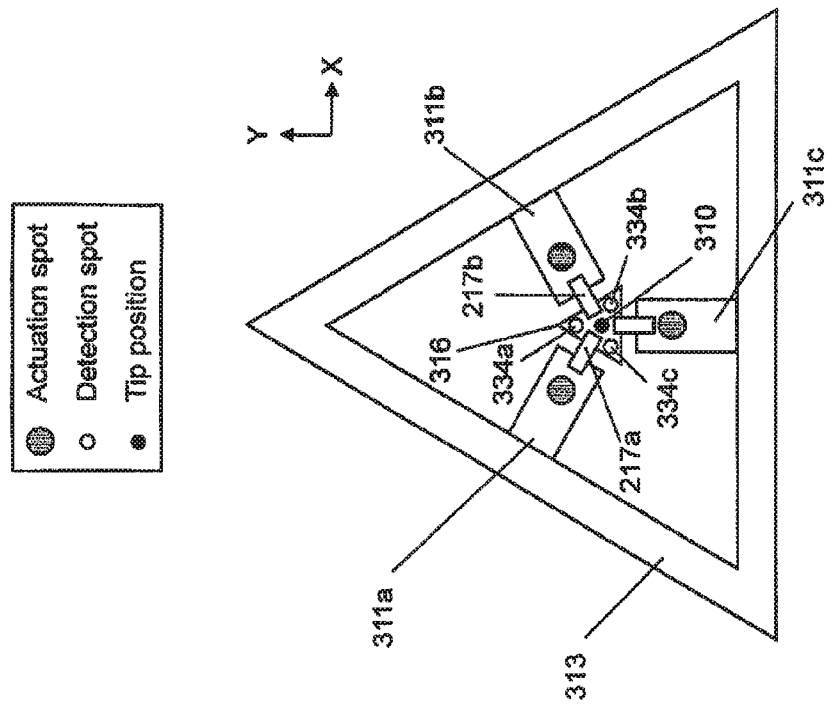
FIG. 10 is a plan view of triangular "picture frame" probe.

FIG. 10 is a plan view of a probe according to a further embodiment of the present invention. The probe comprises a triangular "picture frame" mount 313 and three cantilever arms 311a-c. Each cantilever arm extends from the mount 313 with a proximal end carried by the mount and a free distal end remote from the mount. A pad 316 carries the probe tip 310 on its underside. The arms 311a-c are coupled to the pad by respective hinge members 217a-c. The arms 31a-c, hinges 317a-c and pad 316 are formed from a monolithic structure, typically with uniform thickness although optionally the hinges 317a-c may be thinner than the arms 311a-c and pad 316.

The arms 311a-c are actuated and measured in a similar fashion to the embodiments described above using actuation spots on each arm and detection spots 334a-c which measure heights Ha, Hb, Hc respectively. The detection spots are located on the circumference of a circle centred on the probe tip 310 with radius r and thus with angular separation 120 deg. The height signals Ha. Hb. Hc are input into the probe position signal processor 40 which generates a probe tip height signal TipPosZ=(Ha+Hb+Hc)/3 which is indicative of a height of the tip of the probe, a tilt signal Tipα=a tan ((Hb−Hc)/(sqrt(3)×r)) which is indicative of a tilt angle of the probe in the X direction (as well as a related X-position signal TipPosX), and a tilt signal Tipγ=a tan ((2×Ha−Hb−Hc)/(3×r)) which is indicative of a tilt angle of the probe in the Y direction (as well as a related Y-position signal TipPosY).

The "picture frame" mounts 213, 313 are polygons with four and three sides respectively, and the principle can be extended to a polygonal "picture frame" mount with any number of sides (and associated cantilevers) or a circular "picture frame" mount. In the embodiments of FIGS. 7-10, X and Y lateral position signals TipPosX/TipPosY and their associated desired values TipPosX_Desired/TipPosY_Desired may be input into the feedback controllers 42a, 43 as illustrated in FIG. 8, but alternatively Tipα/Tipγ and associated desired values Tipα_Desired/Tipγ_Desired may be input into the feedback controllers 42a, 43 instead to achieve a similar result.

Figure 11:
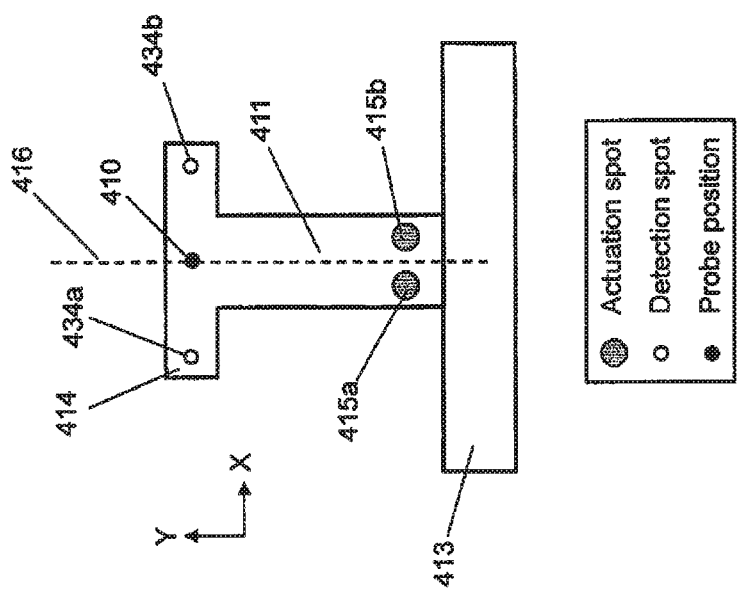
FIG. 11 is a plan view of a probe with a single T-shaped arm.

FIG. 11 is a plan view of a probe according to a further embodiment of the present invention. A single cantilever arm 411 extends from a mount 413. The arm has a T-shape with a cross-bar 414 at its free distal end. Detection spots 434a,b are positioned at opposite ends of the cross-bar 414, and the probe tip 410 is centrally positioned mid-way between the detection spots on a plane of symmetry 416 of the arm. Actuation spots 415a,b are positioned at the proximal end of the arm, one on each side of the plane of symmetry of the arm. When the probe is illuminated by both actuation spots 415a,b with the same power, then the arm bends without twisting so that the probe moves towards the sample (in the ZY plane) and causes a change in TipPosZ but no change in Tipα or TipPosX. When the probe is illuminated by the spot 415a with a greater power than the other spot 415b, then the arm 411 twists clockwise. Similarly, when the probe is illuminated by the spot 415b with a greater power than the other spot 415a, then the arm 411 twists anti-clockwise.

The embodiments of FIGS. 1-8 and 11 are all operable in a common mode in which the actuation controller 24 changes the illumination powers (by operation of control signals A1, A2, A3 etc) at all actuation locations by the same amount so that the probe changes its height (and hence causes a change in the height signal TipPosZ) without tilting in X so there is no simultaneous change in the tilt signal Tipα or TipPosX (although there will be a small change in Tipγ and TipPosY). For these embodiments the processor 24 is also operable to drive the probe in a tilt mode in which it changes a difference between the illumination powers so that the probe tilts and consequently causes a change in Tipα and/or Tipγ without simultaneously changing TipPosZ to any great extent. The precise changes in the illumination powers to achieve a desired change in X, Y or Z is determined by operation of the feedback loops described previously.

The "picture frame" embodiments of FIGS. 9 and 10 are also operable in a common mode in which the actuation controller 24 changes the illumination powers (A1, A2, A3 etc) at all actuation locations by the same amount so that the probe changes its height (and hence causes a change in the height signal TipPosZ). However, unlike the embodiments of FIGS. 1-8, the "picture frame" embodiments of FIGS. 9 and 10 enable the probe to moved in Z without tilting in X or Y (so there is no simultaneous change in either tilt signal Tipα or Tipγ). Like the embodiments of FIGS. 1-8, the "picture frame" embodiments of FIGS. 9 and 10 are also operable to drive the probe in a tilt mode in which the processor 24 changes a difference between the illumination powers so that the probe tilts and consequently causes a change in Tipα and/or Tipγ without simultaneously changing TipPosZ to any great extent.

Figure 12:
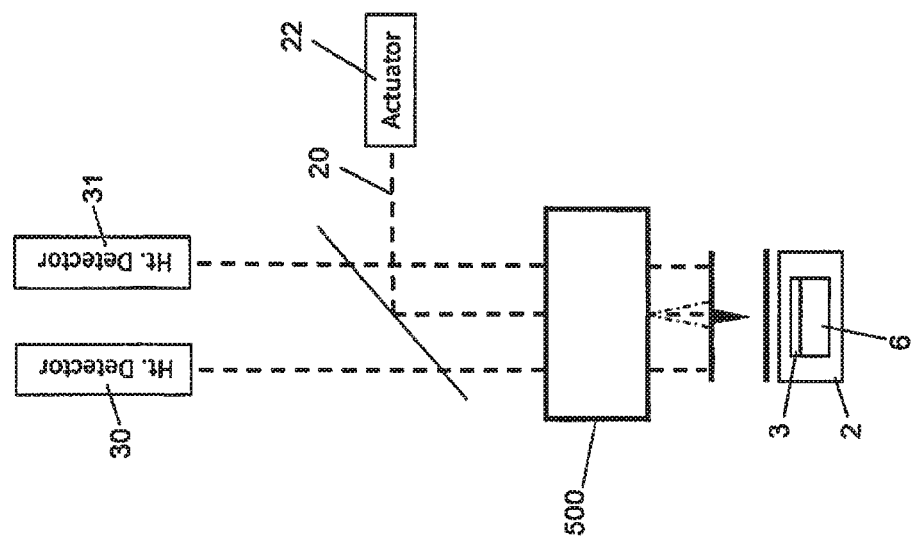
FIG. 12 shows part of an alternative microscope with a single scanned actuation beam.

In the embodiments of the invention described above there are a minimum of two actuation beams 20a-c and two detection beams 32. In the alternative embodiment of FIG. 12 only a single actuation beam 20 is generated from a single actuation laser 22, and this beam is scanned over the probe by a scanning system 500 with an acousto-optic modulator (AOM) or scanning mirror so that it generates a flying spot which cycles between two or more actuation locations rather than being fixed at a single actuation location. In other words, using the embodiment of FIG. 9 as an example, the beam spends a quarter of its time generating spot 234a, a quarter of its time generating spot 234b and so on. Details of a suitable scanning system 500 with a scanning mirror are described in WO-A-2013/114100, the details of which are incorporated herein by reference. Rather than using a "flying spot" which is always on, the beam 20 may be switched off when the scanning mirror is not directed at one of the actuation locations.

A similar principle can be applied to the detection beams. In other words, rather than simultaneously illuminating the probe with multiple detection beams 32, a single detection beam may be directed sequentially to the various detection locations to sample their respective heights.

In the embodiments of the invention described above, the illumination powers A1, A2 etc. are changed by modulating the intensity of the actuation laser 22a,b etc. Thus in this case the instantaneous heating power of the actuation spots change to move the probe. In an alternative embodiment the intensity of the lasers 22a,b, 122a-c may be kept constant but turned on and off in a series of pulses to vary the average illumination power being delivered to the probe—the mark/space ratio of the pulses determining the average power. Equivalently, if a single flying spot is used, then the amount of time spent by the flying spot at each actuation location can be changed in order to independently control the average illumination power being delivered to each actuation location.

The microscopes of FIGS. 1-12 can be operated in a number of different imaging modes including, but not limited to, the imaging mode shown in FIG. 6. In all cases a lateral (XY) raster scanning motion is generated between the probe tip 10 and the sample 1 by moving the sample 1 by operation of the XY position feedback controller 5. In a contact imaging mode, the probe tip 10 remains in contact with the sample at all times, and its measured height TipPosZ is used by the image collection and scan controller 41 to compile an image of the topographical shape of the sample surface. In the intermittent contact imaging mode described above with reference to FIG. 6 (as described in further detail for example in WO-A-2012/104625, the contents of which are incorporated herein by reference) the probe is moved repeatedly towards and away from the sample surface, only contacting it intermittently.

Although the invention has been described above with reference to one or more preferred embodiments, it will be appreciated that various changes or modifications may be made without departing from the scope of the invention as defined in the appended claims.

The invention claimed is:

1. A probe system comprising: a probe with first and second arms and a probe tip carried by the first and second arms, the probe tip having a height and a tilt angle; an illumination system arranged to deform the probe by illuminating the first arm at a first actuation location and the second arm at a second actuation location each with a respective illumination power; and an actuation controller arranged to independently control the illumination power at each actuation location in order to control the height and tilt angle of the probe tip.

2. The probe system of claim 1, wherein the first and second arms are mirror images of each other on opposite sides of a plane of symmetry passing through the probe tip.

3. The probe system of claim 1 further comprising a probe tip support joining the first and second arms, wherein the probe tip support carries the probe tip.

4. The probe system of claim 1 further comprising a detection system arranged to measure a height of the probe tip to generate a height signal and also arranged to measure a tilt angle of the probe tip to generate a tilt signal.

5. The system of claim 4 wherein the actuation locations are positioned so that changing the illumination power at the first actuation location but not the second actuation location causes a change in the tilt signal, changing the illumination power at the second actuation location but not the first actuation location causes a change in the tilt signal, and simultaneously changing the illumination powers at both actuation locations can cause a change in the height signal.

6. The system of claim 4 wherein the actuation locations are positioned so that simultaneously changing the illumination powers at both actuation locations can cause a change in the height signal with substantially no corresponding change in the tilt signal.

7. The system of claim 4 wherein the actuation locations are positioned so that increasing the illumination power at the first actuation location but not the second actuation location causes an increase in the tilt signal, increasing the illumination power at the second actuation location but not the first actuation location causes a decrease in the tilt signal, and simultaneously increasing the illumination powers at both actuation locations causes a change in the height signal.

8. The system of claim 4 wherein the detection system is arranged to illuminate the probe with radiation at two or more detection locations, receive a reflected beam from each detection location and generate a detection signal for each detection location in accordance with a path difference between the reflected beam and a reference beam, each detection signal being indicative of a height of the probe at a respective one of the detection locations, and the detection system is arranged to derive the height signal from the detection signals.

9. The system of claim 1 wherein the actuation controller is arranged to control the illumination power at the first actuation location in accordance with a first control signal, and the actuation controller is arranged to control the illumination power at the second actuation location in accordance with a second control signal which is different than the first control signal.

10. The system of claim 1 wherein the actuation controller is operable to change the illumination power at the first actuation location without simultaneously changing the illumination power at the second actuation, and the actuation controller is also operable to change the illumination power at the second actuation location without simultaneously changing the illumination power at the first actuation location.

11. The system of claim 1 wherein the actuation controller is operable to simultaneously change the illumination powers at both actuation locations.

12. The system of claim 1 wherein the actuation controller is configured to simultaneously change the illumination powers at both actuation locations.

13. The system of claim 12 wherein the actuator controller is configured to change the illumination power at the first actuation location without simultaneously changing the illumination power at the second actuation, and the actuator controller is also operable to change the illumination power at the second actuation location without simultaneously changing the illumination power at the first actuation location.

14. The system of claim 1 wherein the actuation controller is configured to change the illumination power at the first actuation location without simultaneously changing the illumination power at the second actuation, and the actuation controller is also operable to change the illumination power at the second actuation location without simultaneously changing the illumination power at the first actuation location.

15. A probe system comprising: a probe; a detection system arranged to measure a height of the probe to generate a height signal and also arranged to measure a tilt angle of the probe to generate a tilt signal; an illumination system arranged to deform the probe by illuminating it at first and second actuation locations each with a respective illumination power; wherein the probe system is configured to independently control the illumination power at each actuation location in order to control the height and tilt angle of the probe, wherein the probe comprises a probe tip carried by a tip support structure, the first and second actuation locations are on the tip support structure, the tip support structure has a plane of symmetry passing through the probe tip, and the first and second actuation locations are positioned on opposite sides of the plane of symmetry.

16. The system of claim 15 wherein the actuation locations are positioned so that changing the illumination power at the first actuation location but not the second actuation location causes a change in the tilt signal, changing the illumination power at the second actuation location but not the first actuation location causes a change in the tilt signal, and simultaneously changing the illumination powers at both actuation locations can cause a change in the height signal.

17. The system of claim 15 wherein the system is arranged to control the illumination power at the first actuation location in accordance with a first control signal, and the system is arranged to control the illumination power at the second actuation location in accordance with a second control signal which is different than the first control signal.

18. The system of claim 15 wherein the system is operable to change the illumination power at the first actuation location without simultaneously changing the illumination power at the second actuation, and the system is also operable to change the illumination power at the second actuation location without simultaneously changing the illumination power at the first actuation location.

19. The system of claim 15 wherein the actuation locations are positioned so that simultaneously changing the illumination powers at both actuation locations can cause a change in the height signal with substantially no corresponding change in the tilt signal.

20. The system of claim 15 wherein the actuation locations are positioned so that increasing the illumination power at the first actuation location but not the second actuation location causes an increase in the tilt signal, increasing the illumination power at the second actuation location but not the first actuation location causes a decrease in the tilt signal, and simultaneously increasing the illumination powers at both actuation locations causes a change in the height signal.

21. The system of claim 15 wherein the detection system is arranged to illuminate the probe with radiation at two or more detection locations, receive a reflected beam from each detection location and generate a detection signal for each detection location in accordance with a path difference between the reflected beam and a reference beam, each detection signal being indicative of a height of the probe at a respective one of the detection locations, and the detection system is arranged to derive the height signal from the detection signals.

22. The system of claim 15 wherein the probe system includes an actuator controller configured to independently control the illumination power.

23. A method of actuating a probe that includes first and second arms and a probe tip carried by the first and second arms, the probe tip having a height and a tilt angle, the method comprising: deforming the probe by illuminating each of the arms with a respective illumination power; and independently controlling the illumination power at each arm in order to control a height and tilt angle of the probe tip.

24. A method of actuating and measuring a probe, the method comprising: measuring a height of the probe to generate a height signal; measuring a tilt angle of the probe to generate a tilt signal; deforming the probe by illuminating it at first and second actuation locations each with a respective illumination power; and independently controlling the illumination power at each actuation location in order to control the height and tilt angle of the probe, wherein the probe comprises a probe tip carried by a tip support structure, the first and second actuation locations are on the tip support structure, the tip support structure has a plane of symmetry passing through the probe tip, and the first and second actuation locations are positioned on opposite sides of the plane of symmetry.

* * * * *